US012574845B2

(12) United States Patent
Li et al.

(10) Patent No.: US 12,574,845 B2
(45) Date of Patent: Mar. 10, 2026

(54) METHODS AND APPARATUSES FOR ENERGY SAVING

(71) Applicant: VIVO MOBILE COMMUNICATION CO., LTD., Dongguan (CN)

(72) Inventors: Dongru Li, Dongguan (CN); Xiaodong Shen, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 342 days.

(21) Appl. No.: 18/195,913

(22) Filed: May 10, 2023

(65) Prior Publication Data

US 2023/0284141 A1     Sep. 7, 2023

Related U.S. Application Data

(63) Continuation of application No. PCT/CN2021/130203, filed on Nov. 12, 2021.

(30) Foreign Application Priority Data

Nov. 12, 2020     (CN) ......................... 202011263285.X
Nov. 13, 2020     (CN) ......................... 202011273233.0

(51) Int. Cl.
*H04W 52/02* (2009.01)
*H04L 5/00* (2006.01)
(Continued)

(52) U.S. Cl.
CPC ....... *H04W 52/0225* (2013.01); *H04L 5/0053* (2013.01); *H04L 5/0094* (2013.01);
(Continued)

(58) Field of Classification Search
None
See application file for complete search history.

(56) References Cited

U.S. PATENT DOCUMENTS 11,658,792 B2 * 5/2023 He ......................... H04L 5/0053
370/329
2020/0229092 A1 * 7/2020 Wu ......................... H04W 76/28
(Continued)

FOREIGN PATENT DOCUMENTS

CN          110166191 A     8/2019
CN          110677911 A     1/2020
(Continued)

OTHER PUBLICATIONS

European Search Report issued in related European Application No. 21891198.0, mailed Mar. 20, 2024, 13 pages.
(Continued)

*Primary Examiner* — Omar J Ghowrwal
(74) *Attorney, Agent, or Firm* — IPX PLLC

(57) ABSTRACT
An energy saving indication method and apparatus, a device, and a readable storage medium, are provided. The method includes: receiving first DCI, where the first DCI includes: a first indication; and determining a PDCCH monitoring behavior based on the first DCI, where the first indication is used to indicate at least one of the following: switching to a target search space group or skipping PDCCH monitoring.

20 Claims, 8 Drawing Sheets

301

Receive first DCI, where the first DCI includes: a first indication

302

Determine a PDCCH monitoring behavior based on the first DCI

(51) Int. Cl.

| | | |
|---|---|---|
| *H04W 24/02* | (2009.01) | |
| *H04W 24/08* | (2009.01) | |
| *H04W 72/232* | (2023.01) | |
| *H04W 76/28* | (2018.01) | |

(52) U.S. Cl.

CPC ........... *H04W 24/02* (2013.01); *H04W 24/08* (2013.01); *H04W 52/02* (2013.01); *H04W 52/0216* (2013.01); *H04W 52/0229* (2013.01); *H04W 52/0235* (2013.01); *H04W 52/0274* (2013.01); *H04W 72/232* (2023.01); *H04W 76/28* (2018.02); *Y02D 30/70* (2020.08)

(56) References Cited

U.S. PATENT DOCUMENTS

| | | | | |
|---|---|---|---|---|
| 2021/0029683 A1* | 1/2021 | Jiang | ..................... | H04L 5/0053 |
| 2023/0043850 A1* | 2/2023 | Li | ..................... | H04W 52/0235 |
| 2024/0023131 A1* | 1/2024 | You | ..................... | H04W 72/232 |

FOREIGN PATENT DOCUMENTS

| | | |
|---|---|---|
| CN | 111278092 A | 6/2020 |
| CN | 111278096 A | 6/2020 |
| CN | 111867021 A | 10/2020 |
| EP | 3716697 A1 | 9/2020 |
| WO | 2020182124 A | 9/2020 |
| WO | 2020204484 A1 | 10/2020 |

OTHER PUBLICATIONS

Samsung, "Discussion on DCI-based power saving techniques", 3GPP Draft, R1-2008177, Oct. 2020, 8 pages.

MediaTek Inc., "Discussion on DCI-based power saving adaptation during DRX active time", 3GPP Draft, R1-2008966, Nov. 2020, 10 pages.

Qualcomm Incorporated, "DCI-based power saving adaptation during DRX Active Time", 3GPP Draft, R1-2009268, Nov. 2020, 6 pages.

Moderator (vivo), "FL summary#1 of power saving for Active Time", 3GPP Draft, R1-2009655, Nov. 2020, 65 pages.

First Office Action issued in related Chinese Application No. 202011273233.0, mailed Dec. 26, 2023, 8 pages.

International Search Report issued in corresponding International Application No. PCT/CN2021/130203, mailed Feb. 10, 2022, 4 pages.

* cited by examiner

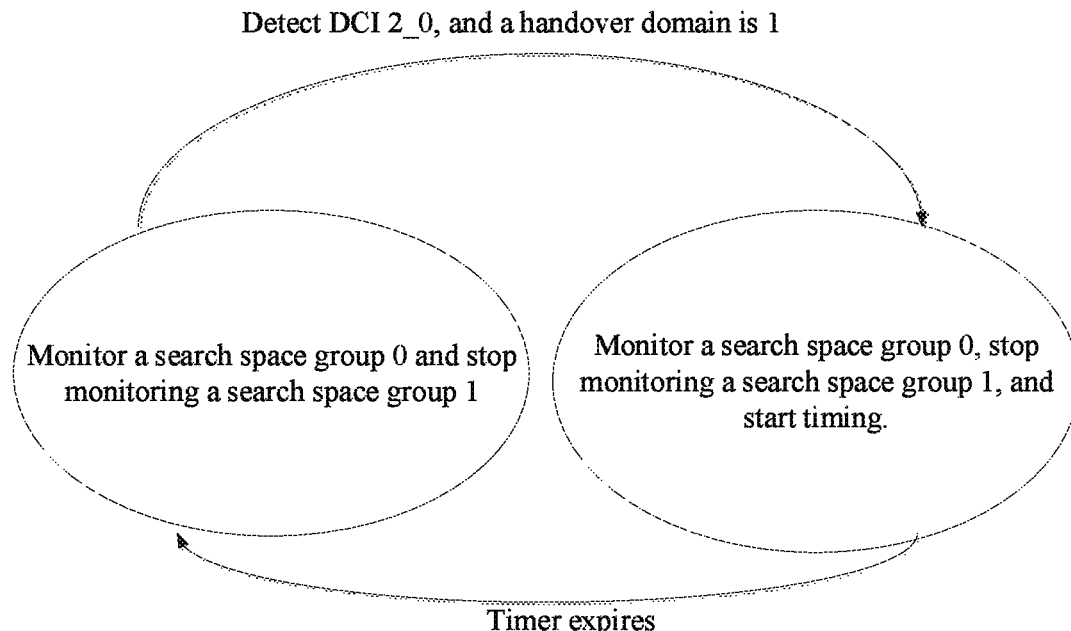

Detect DCI 2_0, and a handover domain is 1

Monitor a search space group 0 and stop monitoring a search space group 1

Monitor a search space group 0, stop monitoring a search space group 1, and start timing.

Timer expires

FIG. 1a

Detect any DCI on a search space set associated with a search space group 0

Monitor a search space group 0 and stop monitoring a search space group 1

Monitor a search space group 0, stop monitoring a search space group 1, and start timing.

Detect any DCI on any search space set

Timer expires

Receive first DCI, where the first DCI includes: a first indication

302

Determine a PDCCH monitoring behavior based on the first DCI

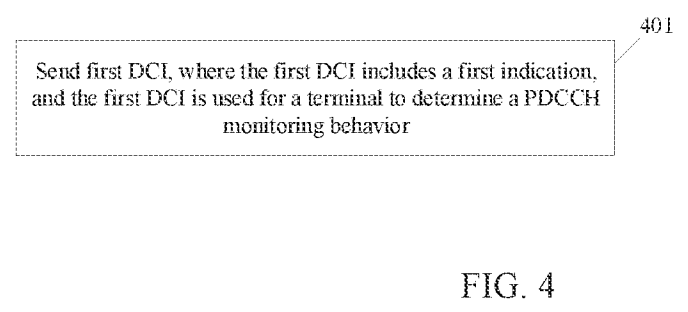

401

Send first DCI, where the first DCI includes a first indication, and the first DCI is used for a terminal to determine a PDCCH monitoring behavior

FIG. 4

METHODS AND APPARATUSES FOR ENERGY SAVING

CROSS-REFERENCE TO RELATED APPLICATIONS

This application is a continuation of international Application No. PCT/CN2021/130203, filed on Nov. 12, 2021, which claims priority to Chinese Patent Application No. 202011263285.X, filed on Nov. 12, 2020, and priority to Chinese Patent Application No. 202011273233.0, filed on Nov. 13, 2020. The entire contents of each of the above-identified applications are expressly incorporated herein by reference.

TECHNICAL FIELD

This application pertains to the field of communications technologies, and in particular, to an energy saving indication method and apparatus, a device, and a readable storage medium.

BACKGROUND

Referring to FIG. 1a and FIG. 1b, two Search Spaces (SS) group can be configured in the communications system. The terminal may switch between the two search space groups in an explicit or implicit mechanism, so as to adjust monitoring adaptability of a Physical Downlink Control CHannel (PDCCH), thus realizing energy saving of the terminal. In another energy saving solution, a relevant indication may be obtained to skip PDCCH monitoring, so as to save energy. Skipping the PDCCH monitoring refers to not monitoring the PDCCH.

However, the foregoing energy saving solution has poor flexibility and cannot meet various energy saving requirements of the terminal. In addition, due to the poor flexibility of the foregoing solution, it is impossible to realize dynamic and rapid adjustment on the PDCCH monitoring, and it may also cause problems such as data transmission delay and increased power consumption.

SUMMARY

Embodiments of this application provide an energy saving indication method and apparatus, a device, and a readable storage medium.

According to a first aspect, an energy saving indication method is provided, where the method is performed by a terminal and includes:

receiving first downlink control information (Downlink Control Information, DCI), where the first DCI includes: a first indication; and determining a PDCCH monitoring behavior based on the first DCI, where the first indication is used to indicate at least one of the following: switching to a target search space group or skipping PDCCH monitoring.

According to a second aspect, an energy saving indication method is provided, where the method is performed by a network side device and includes:

sending first DCI, where the first DCI includes a first indication, and the first DCI is used for a terminal to determine a PDCCH monitoring behavior, where the first indication is used to indicate at least one of the following: switching to a target search space group or skipping PDCCH monitoring.

According to a third aspect, an energy saving indication apparatus is provided, and the apparatus includes:

a first receiving module, configured to receive first DCI, where the first DCI includes: a first indication; and a first determining module, configured to determine a PDCCH monitoring behavior based on the first DCI, where the first indication is used to indicate at least one of the following: switching to a target search space group or skipping PDCCH monitoring.

According to a fourth aspect, an energy saving indication apparatus is provided; and the apparatus includes:

a sending module, configured to send first DCI, where the first DCI includes a first indication, and the first DCI is used for a terminal to determine a PDCCH monitoring behavior, where the first indication is used to indicate at least one of the following: switching to a target search space group or skipping PDCCH monitoring.

According to a fifth aspect, a terminal is provided, including a processor, a memory, and a program stored in the memory and executable on the processor, where when the program is executed by the processor, steps of the method according to the first aspect are implemented.

According to a sixth aspect, a network side device is provided, where the network side device includes a processor, a memory, and a program stored in the memory and executable on the processor, and when the program is executed by the processor, steps of the method according to the second aspect are implemented.

According to a seventh aspect, a readable storage medium is provided, where the readable storage medium stores a program or an instruction, and when the program or the instruction is executed by a processor, steps of the method according to the first aspect or the second aspect are implemented.

According to an eighth aspect, a computer program product is provided, where the computer program product is stored in a non-volatile storage medium, and the computer program product is executed by at least one processor to implement steps of the method according to the first aspect or the second aspect.

According to a ninth aspect, a chip is provided, where the chip includes a processor and a communications interface, the communications interface is coupled to the processor, and the processor is configured to run a program or an instruction to implement the method according to the first aspect or the second aspect.

In the embodiments of this application, the network side may send the first DCI to the terminal, instructing the terminal to switch to the target search space group and/or skip the PDCCH monitoring.

BRIEF DESCRIPTION OF DRAWINGS

FIG. 1a is a schematic diagram of an explicit search space set switching mechanism;

FIG. 1b is a schematic diagram of an implicit search space set switching mechanism;

FIG. 4 is a second flowchart of an energy saving indication method according to an embodiment of this application;

DETAILED DESCRIPTION

The following describes the embodiments of this application with reference to the accompanying drawings in the embodiments of this application. Apparently, the described embodiments are some but not all of the embodiments of this application. Based on the embodiments of this application, all other embodiments obtained by a person of ordinary skill in the art without creative efforts shall fall within the protection scope of this application.

The terms "first," "second," and the like in the specification and claims of this application are used to distinguish between similar objects instead of describing a designated order or sequence. It should be understood that, data termed in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, "and" in the specification and claims represents at least one of connected objects. Symbol "/" generally represents an "or" relationship between associated objects.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-Carder Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. However, a New Radio (NR) system is described in the following description for illustrative purposes, and the NR terminology is used in most of the following description, although these technologies can also be applied to applications other than the NR system application, such as the $6^{th}$ Generation (6G) communication system.

Figure 2:
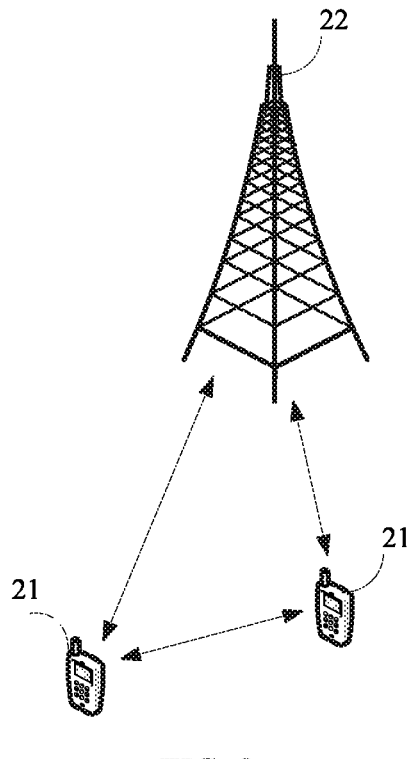
FIG. 2 is a block diagram of a wireless communications system to which embodiments of this application can be applied.

FIG. 2 is a block diagram of a wireless communications system to which embodiments of this application can be applied. The wireless communications system includes a terminal 21 and a network side device 22. The terminal 21 may also be referred to as a terminal device or User Equipment (UE). The terminal 21 may be a terminal side device such as a mobile phone, a tablet personal computer, a laptop computer or a notebook computer, a Personal Digital Assistant (PDA), a palmtop computer, a netbook, an Ultra-Mobile Personal Computer (UMPC), a Mobile Internet Device (MID), a wearable device, Vehicle User Equipment (VUE), or Pedestrian User Equipment (PUE). The wearable device includes a bracelet, a headset, glasses, and the like. It should be noted that a specific type of the terminal 21 is not limited in the embodiments of this application. The network side device 22 may be a base station or a core network. The base station may be referred to as a NodeB, an evolved NodeB (eNB), an access point, a Base Transceiver Station (BTS), a radio base station, a radio transceiver, a Basic Service Set (BSS), an Extended Service Set (ESS), a home NodeB, a home evolved NodeB, a WLAN access point, a WLAN (e.g., WIFI™) node, a Transmission and Reception Point (TRP), or another appropriate term in the art. As long as the same technical effect is achieved, the base station is not limited to a specific technical term. It should be noted that the base station in the NR system is taken only as an example in the embodiments of this application, but a specific type of the base station is not limited.

An energy saving indication method and apparatus, a device, and a readable storage medium provided in the embodiments of this application are described below in detail through some embodiments and application scenarios thereof with reference to the accompanying drawings.

Figure 3:
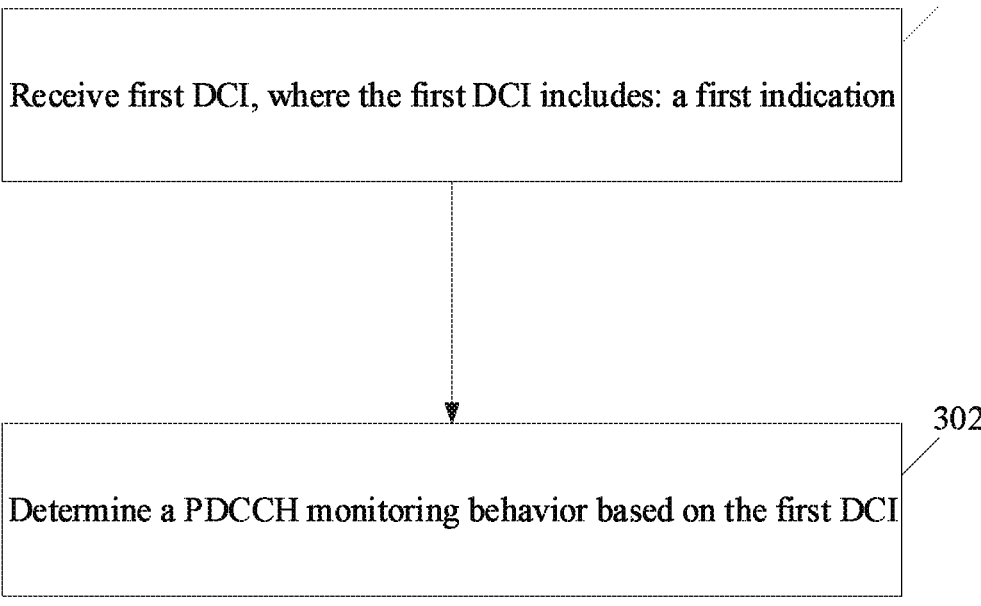
FIG. 3 is a first flowchart of an energy saving indication method according to an embodiment of this application.

Referring to FIG. 3, an embodiment of this application provides an energy saving indication method, executed by a terminal, and the method specifically includes: step 301 to step 302.

Step 301: Receive first DCI, where the first DCI includes: a first indication.

Step 302: Determine a PDCCH monitoring behavior based on the first DCI.

The first indication is used to indicate at least one of the following: switching to a target search space group or skipping PDCCH monitoring.

It should be noted that in this specification, skipping the PDCCH monitoring may refer to not performing the PDCCH monitoring, or skipping a specific type of PDCCH monitoring.

For example, the first indication includes a 1 bit, where when the 1 bit is a first value, it indicates switching to the target search space group, and when the 1 bit is a second value, it indicates skipping PDCCH monitoring.

For another example, the first indication includes a 2 bit, where when the 2 bit is a third value, it indicates switching to the target search space group; when the 2 bit is a fourth value, it indicates skipping PDCCH monitoring; and when the 2 bit is a fifth value, it indicates switching to the target search space group and skipping PDCCH monitoring.

For example, the first indication includes a 1 bit, and bit fields of the 1 bit are: '0' indicates switching to the target search space group, '1' indicates skipping PDCCH monitoring, or vice versa.

For another example, the first indication includes a 2 bit, where values of the 2 bit may be "00," "01," "10," and "11," and three of these four values respectively indicate switching to the target search space group, skipping PDCCH monitoring, and switching to the target search space group and skipping PDCCH monitoring, and the remaining one value is used as a reserved value or an invalid value. For example, bit fields of the 2 bit are: '00' indicates switching to the target search space group, '01' indicates skipping PDCCH monitoring, '10' indicates switching to the target search space group and skipping PDCCH monitoring, and '11' is used as a reserved value or an invalid value.

It should be noted that the 1 bit and the 2 bit are only used to indicate the purpose of the first indication, not the specific content of the purpose, and the specific content of the purpose can be indicated by other indication fields in the DCI or by other signaling, such as RRC signaling.

Further, after the purpose of the first indication is determined, the first indication needs to indicate the specific content of the purpose. For example, the first indication includes the 1 bit, which is used to indicate switching to the target search space group, and further includes the 2 bit, which is used to indicate a specific target search space group index. For another example, the first indication includes the 1 bit, which is used to indicate skipping PDCCH monitoring, and further includes the 2 bit, which is used to indicate how to specifically skip PDCCH monitoring (including a type of skipping PDCCH monitoring or duration of skipping PDCCH monitoring, and the like).

In this embodiment of this application, the first DCI further includes a second indication, where the second indication is used to indicate a first time interval (for example, duration), and the terminal may determine a PDCCH monitoring behavior within the first time interval and/or after the first time interval based on the first DCI.

In this way, the terminal may determine the PDCCH monitoring behavior within the first time interval and/or the PDCCH monitoring behavior after the first time interval through the first DCI, that is, the network side may indicate the PDCCH monitoring behavior within and/or after the duration to the terminal, so as to realize flexible and dynamic energy saving indication and meet various energy saving requirements of the terminal.

In this embodiment of this application, before the step of receiving the first DCI, the method further includes: obtaining information about a first search space group and/or a second search space group, where the first search space group is not associated with any search space or the first search space group is not configured with configuration information related to PDCCH monitoring, that is, not performing PDCCH monitoring on the first search space group; and the second search space group is used for PDCCH monitoring after the first time interval, that is, in some embodiments, after determining the PDCCH monitoring behavior within the first time interval based on the first DCI, performing PDCCH monitoring by using the second search space group after the first time interval.

It should be noted that the first search space group is a newly defined search space group in this embodiment of this application.

In the communications system, the network may be configured with a plurality of search space groups, for example, a search space group 0, and a search space in the search space group 0 is characterized by a more sparse PDCCH monitoring period; a search space group 1, where the search space group 1 has a more dense PDCCH monitoring period; and a search space group 2, where the search space group 2 is not associated with any search space or the first search space group is not configured with configuration information related to PDCCH monitoring, and the like. The second search space group can be any of the search space group 0, the search space group 1, the search space group 2, or other search space groups.

In some implementations, the configuration information related to the PDCCH monitoring may include one or more of the following items: (1) a search space index, (2) a search space monitoring period, (3) search space duration, (4) a COntrol REsource SET (CORESET) index, and (5) CORESET duration.

In some implementations, the first search space group and/or the second search space group are/is configured by a network side and/or specified by a protocol.

For example, the network side is configured with the first search space, it is specified in the protocol to monitor the PDCCH by using the second search space group after the first time interval, and the second search space group is the search space group 1.

In this embodiment of this application, the second search space group includes at least one of the following:

(1) an arbitrary search space group in search space groups configured in a network;

It should be noted that the arbitrary search space group in search space groups configured in a network refers to the two search space groups specified in the existing protocol: the search space group 0 and the search space group 1. The PDCCH monitoring period of the search space group 0 is more dense or sparse than that of the search space group 1.

(2) a default search space group;

It should be noted that the network configures (designates) the arbitrary search space group as the default search space group.

(3) the first search space group; and (4) a current search space group.

It should be noted that the current search space group refers to a search space group used by the terminal before receiving the first DCI.

In this embodiment of this application, the determining a PDCCH monitoring behavior within the first time interval and/or after the first time interval based on the first DCI includes any one of the following:

(1) in a case that the first indication is used to indicate switching to the target search space group, monitoring the PDCCH by using the target search space group within the first time interval; and (2) in a case that the first indication is used to indicate switching to the target search space group, monitoring the PDCCH by using the target search space group within the first time interval, and monitoring the PDCCH by using the second search space group after the first time interval.

In this embodiment of this application, the determining a PDCCH monitoring behavior within the first time interval and/or after the first time interval based on the first ICI includes any one of the following:

(1) in a case that the first indication is used to indicate skipping PDCCH monitoring, skipping PDCCH monitoring within the first time interval; and (2) in a case that the first indication is used to indicate skipping PDCCH monitoring, skipping PDCCH monitoring within the first time interval, and monitoring the PDCCH by using the second search space group after the first time interval.

In this embodiment of this application, the determining a PDCCH monitoring behavior within the first time interval and/or after the first time interval based on the first DCI includes any one of the following:

in a case that the first indication is used to indicate switching to the target search space group and skipping PDCCH monitoring, skipping PDCCH monitoring within the first time interval, and monitoring the PDCCH by using the target search space group after the first time interval; and in a case that the first indication is used to indicate switching to the target search space group and skipping PDCCH monitoring, skipping PDCCH monitoring within the first time interval, and monitoring the PDCCH by using the second search space group after the first time interval.

In a case that the first indication is used to indicate switching to the target search space group and skipping PDCCH monitoring, skipping PDCCH monitoring within the first time interval. In addition, the terminal, selects based on a specification in a protocol or independently selects, within the target search space group and the second search space group, to monitor the PDCCH through the target search space group or monitor the PDCCH through the second search space group after the first time interval.

In an embodiment, in a case that the first indication is used to indicate switching to the target search space group and skipping PDCCH monitoring, the terminal skips PDCCH monitoring within the first time interval, and selects to monitor the PDCCH by using the target search space group after the first time interval. For the selection method, an application priority of the target search space group and an application priority of the second search space group in this case may be specified in the protocol. In this embodiment, it is specified in the protocol that the priority of the target search space group indicated in the first DCI is higher.

In another embodiment of this application, in a case that the first indication is used to indicate switching to the target search space group and skipping PDCCH monitoring, the PDCCH monitoring behavior further includes: monitoring the PDCCH by using the target search space group within the first time interval, and skipping PDCCH monitoring after the first time interval.

It should be noted that, the premise of the foregoing four embodiments may be any of the following:
(1) the first DCI includes only the first indication;
(2) the first DCI includes only the first indication and the second indication;
(3) the first DCI includes only the first indication, and the first search space group and/or the second search space group are/is configured in the network and/or specified in a protocol before receiving the first DCI; and
(4) the first includes the first indication and the second indication, and the first search space group and/or the second search space group are/is configured in the network and/or specified in a protocol before receiving the first DCI, and the like.

In this embodiment of this application, the target search space group includes at least one of the following:
(1) an arbitrary search space group in search space groups configured in a network;
(2) a default search space group; or
(3) the first search space group.

For example, if the terminal receives the first DCI, the first indication is used to indicate switching to the target search space group, and the target search space group is the first search space group, the behavior of the UE is to perform PDCCH monitoring based on the first search space group, that is, not to perform the PDCCH monitoring.

In this embodiment of this application, a unit of the first time interval is any one of the following:
(1) a slot;
(2) a symbol;
(3) a millisecond;
(4) a PDCCH monitoring period of the target search space group;
(5) a PDCCH monitoring period of a current search space group; and
(6) a Discontinuous Reception (DRX) cycle.

For example, if the first indication is to skip the PDCCH monitoring, the duration (the first time interval) is 5, and the unit is the PDCCH monitoring period of the target search space group, the terminal skips the PDCCH monitoring with a PDCCH monitoring period length of 5 target search space groups after receiving the first DCI.

In this embodiment of this application, a start moment of the first time interval is at least one of the following:
(1) an effective moment of the first indication;
(2) an application moment of the first indication; or
(3) a start moment of a specific time unit after receiving the first DCI.

It should be noted that the receiving the first DCI refers to finishing receiving of the first DCI. For example, if the first DCI lasts for 2 symbols, the receiving the first DCI is finished at the second symbol.

In some implementations, the specific time unit may be a first slot, symbol, or ms. In another embodiment, the specific time unit may be M slots, M symbols or M milliseconds, where M is greater than or equal to 0.

In this embodiment of this application, an interval between the effective moment of the first indication and finishing receiving the first DCI is an effective delay of the first indication, or an interval between the application moment of the first indication and finishing receiving the first DCI is an application delay of the first indication.

In the embodiments of this application, the network side may send the first DCI to the terminal, instructing the terminal to switch to the target search space group and/or skip the PDCCH monitoring, to realize flexible and dynamic energy saving indication, and a PDCCH monitoring behavior of the terminal is clear; thus meeting various energy saving requirements of the terminal.

Referring to FIG. 4, an embodiment of this application provides an energy saving indication method, executed by a network side device, and the method specifically includes the following steps.

Step 401: Send first DCI, where the first DCI includes a first indication, and the first DCI is used for a terminal to determine a PDCCH monitoring behavior.

The first indication is used to indicate at least one of the following: switching to a target search space group or skipping PDCCH monitoring.

In this embodiment of this application, the first indication includes a 1 bit, where when the 1 bit is a first value, it indicates switching to the target search space group, and when the 1 bit is a second value, it indicates skipping PDCCH monitoring.

In this embodiment of this application, the first indication includes a 2 bit, where when the 2 bit is a third value, it indicates switching to the target search space group; when the 2 bit is a fourth value, it indicates skipping PDCCH monitoring; and when the 2 bit is a fifth value, it indicates switching to the target search space group and skipping PDCCH monitoring.

In this embodiment of this application, the first DCI further includes a second indication, where the second indication is used to indicate a first time interval, and the first DCI is used to determine a PDCCH monitoring behavior within the first time interval and/or after the first time interval.

In this way, the terminal may determine the PDCCH monitoring behavior within the first time interval and/or the PDCCH monitoring behavior after the first time interval through the first DCI, that is, the network side may indicate the PDCCH monitoring behavior within and/or after the duration to the terminal, so as to realize flexible and dynamic energy saving indication and meet energy saving requirements of the terminal.

In this embodiment of this application, the method further includes: configuring a first search space group and/or a second search space group, where the first search space group is not associated with any search space or the first search space group is not configured with configuration information related to a PDCCH; and the second search space group is used for PDCCH monitoring after the first time interval.

In this embodiment of this application, the second search space group includes any one of the following: (1) an arbitrary search space group, (2) a default search space group, (3) the first search space group, and (4) a current search space group in search space groups configured in a network.

In this embodiment of this application, in a case that the first indication is used to indicate switching to the target search space group, the PDCCH monitoring behavior includes any one of the following:

(1) monitoring the PDCCH by using the target search space group within the first time interval; and (2) monitoring the PDCCH by using the target search space group within the first time interval, and monitoring the PDCCH by using the second search space group after the first time interval.

In this embodiment of this application, in a case that the first indication is used to indicate skipping PDCCH monitoring, the PDCCH monitoring behavior includes any one of the following:

(1) skipping PDCCH monitoring within the first time interval; and (2) skipping PDCCH monitoring within the first time interval; and monitoring the PDCCH by using the second search space group after the first time interval.

In this embodiment of this application, in a case that the first indication is used to indicate switching to the target search space group and skipping PDCCH monitoring, the PDCCH monitoring behavior includes:

(1) skipping PDCCH monitoring within the first time interval, and monitoring the PDCCH by using the target search space group after the first time interval; and (2) skipping PDCCH monitoring within the first time interval, and monitoring the PDCCH by using the second search space group after the first time interval.

In this embodiment of this application, the target search space group includes at least one of the following:

(1) an arbitrary search space group in search space groups configured in a network;

(2) a default search space group; or (3) a first search space group.

In this embodiment of this application, a unit of the first time interval is any one of the following:

(1) a slot;

(2) a symbol;

(3) a ms;

(4) a PDCCH monitoring period of the target search space group;

(5) a PDCCH monitoring period of a current search space group; and (6) a DRX cycle.

In this embodiment of this application, a start moment of the first time interval is at least one of the following:

(1) an effective moment of the first indication;

(2) an application moment of the first indication; or (3) a start moment of a specific time unit after receiving the first DCI.

In some implementations, the specific time unit may be a first slot, symbol, or ms. In another embodiment, the specific time unit may be M slots, M symbols or M milliseconds, where M is greater than or equal to 0.

In this embodiment of this application, an interval between the effective moment of the first indication and finishing receiving the first DCI is an effective delay of the first indication, or an interval between the application moment of the first indication and finishing receiving the first DCI is an application delay of the first indication.

In the embodiments of this application, the network side may send the first DCI to the terminal, instructing the terminal to switch to the target search space group and/or skip the PDCCH monitoring, to realize flexible and dynamic energy saving indication, and a PDCCH monitoring behavior of the terminal is clear, thus meeting various energy saving requirements of the terminal. Implementations of this application are described below with reference to Embodiment 1 and Embodiment 2.

Figure 5:
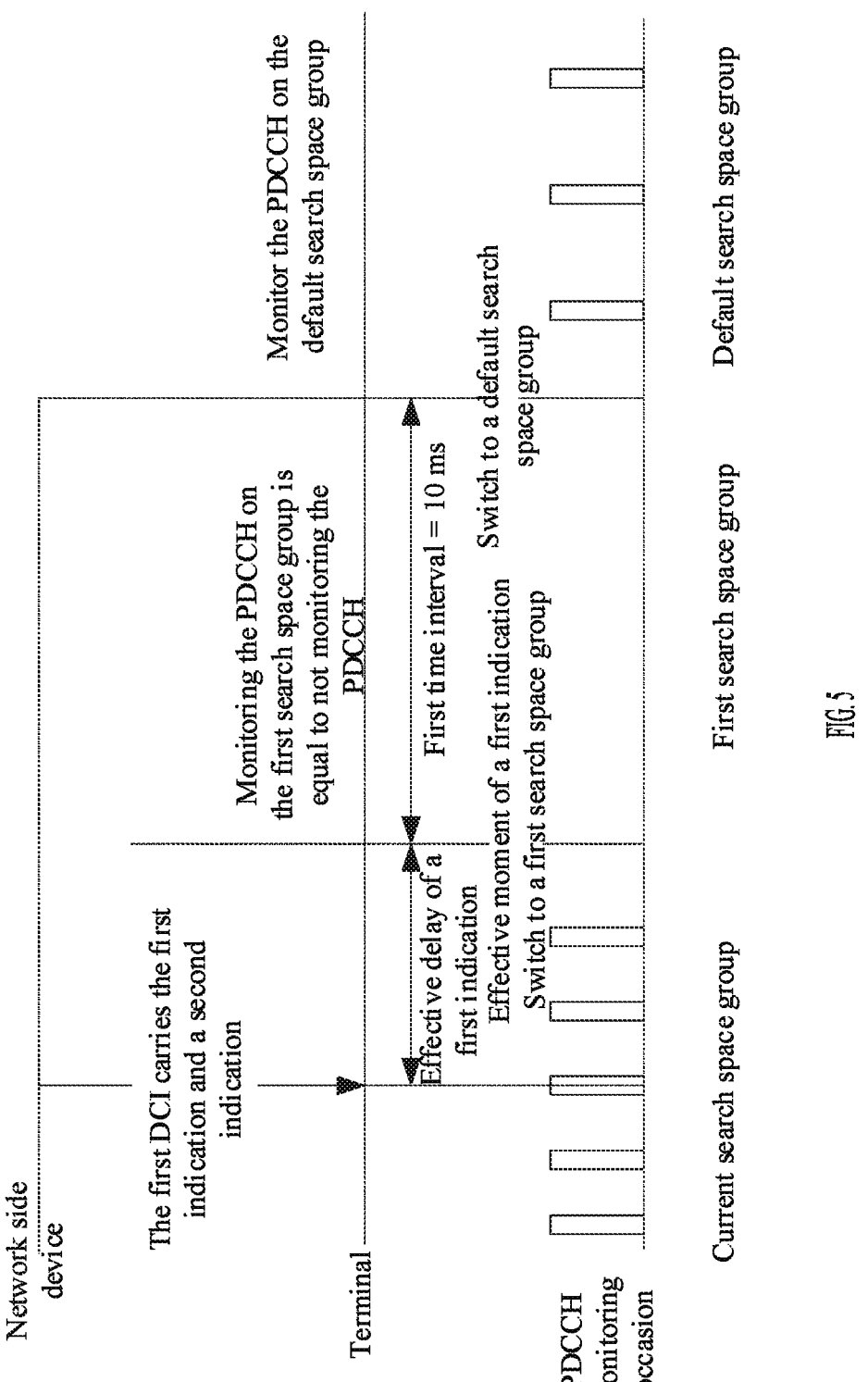
FIG. 5 is a schematic diagram of first DCI indicating search space group switching according to an embodiment of this application.

Embodiment 1: Referring to FIG. 5

In this embodiment, it is specified in the protocol that the PDCCH monitoring behavior after the first time interval is to switch to the default search space group and continue to monitor the PDCCH.

In some implementations, the network side is configured with the first search space group.

In some implementations, the first search space group is not associated with any search space or not configured with configuration information of PDCCH monitoring, that is, the UE does not perform PDCCH monitoring on the first search space group.

In this embodiment, the UE receives the first DCI, and the first DCI includes the first indication and the second indication.

In some implementations, the first indication is used to indicate switching to the first search space group, the second indication is used to indicate that the first time interval may be 10 ms, and a start moment of the first time interval may be an effective moment of the first indication.

In this embodiment, based on the first indication and the second indication in the first DCI, the UE may use the first search space group to monitor the PDCCH within 10 ms after the first indication takes effect, and switch to the default search space group to continue to monitor the PDCCH after 10 ms.

According to Embodiment 1, the terminal dynamically determines the PDCCH monitoring behavior within the first time interval by receiving the first DCI, and determines the PDCCH monitoring behavior after the first time interval according to a specification in a protocol. In this way, the terminal can flexibly monitor the PDCCH based on the network indication, dynamically adapt to the current business situation, and avoid the increase of power consumption of the terminal and data packet transmission delay caused by the excessive application delay and limited flexibility of the energy saving indication.

Figure 6:
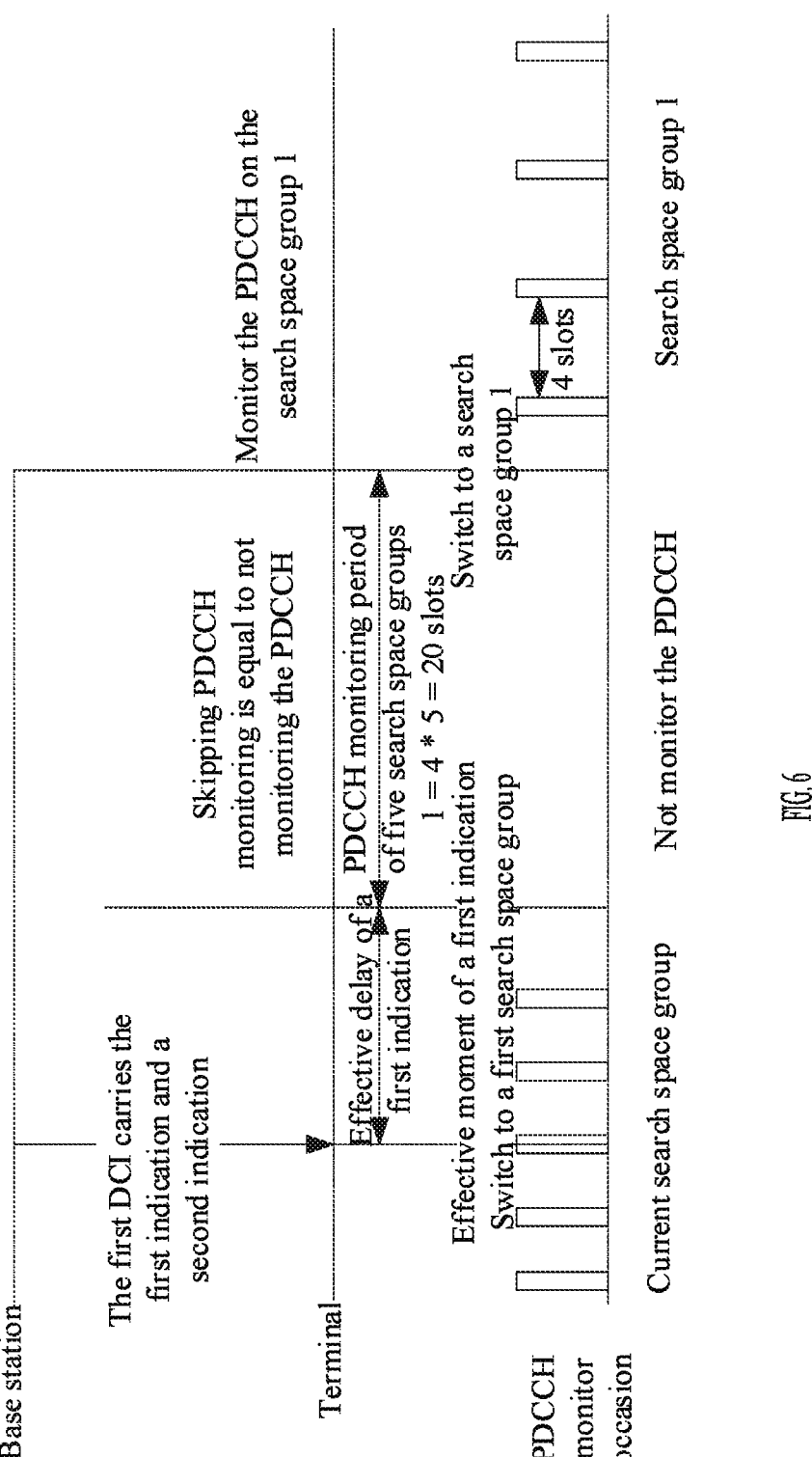
FIG. 6 is a schematic diagram of first indicating skipping PDCCH monitoring and search space group switching according to an embodiment of this application.

Embodiment 2: Referring to FIG. 6

In this embodiment, it is specified in the protocol that the PDCCH monitoring behavior after the first time interval is to switch to the target search space group (that is, the search space group 1) to monitor the PDCCH based on the first indication in the first DCI.

In this embodiment, the UE receives the first DCI, and the first DCI includes the first indication and the second indication.

In some implementations, the first indication is used to indicate switching to the search space group 1 and skipping the PDCCH monitoring, for example, the search space group 1 may be a search space group configured by the protocol.

In some implementations, the second indication indicates that the first time interval is 5, and the unit of the first time interval is the PDCCH monitoring period of the search space group 1. The start moment of the first time interval may be the effective moment of the first indication.

In this embodiment, based on the first indication and the second indication in the first DCI, the UE skips PDCCH monitoring of the PDCCH monitoring period with a time length of 5 search space groups 1 after the first indication takes effect, and switches to the search space group 1 to continue to monitor the PDCCH after skipping the PDCCH monitoring.

According to Embodiment 2, the terminal dynamically determines the PDCCH monitoring behavior within the first time interval and the PDCCH monitoring behavior after the first time interval by receiving the first DCI. Compared with Embodiment 1, the PDCCH monitoring behavior after the first time interval is determined more dynamically in Embodiment 2. In this way, the terminal can flexibly monitor the PDCCH based on the network indication, dynamically adapt to the current business situation, and avoid the increase of power consumption of the terminal and data packet transmission delay caused by the excessive application delay and limited flexibility of the energy saving indication.

Figure 7:
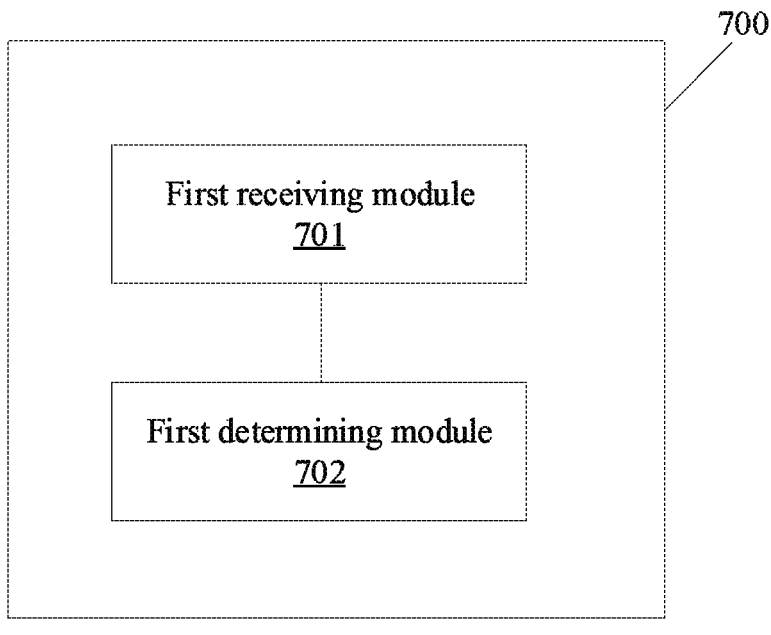
FIG. 7 is a first schematic diagram of an energy saving indication apparatus according to an embodiment of this application.

Referring to FIG. 7, an embodiment of this application provides an energy saving indication apparatus. The apparatus 700 includes:

a first receiving module 701, configured to receive first DCI, where the first DCI includes: a first indication; and a first determining module 702, configured to determine a PDCCH monitoring behavior based on the first DCI, where the first indication is used to indicate at least one of the following: switching to a target search space group or skipping PDCCH monitoring.

In this embodiment of this application, the first indication includes a 1 bit, where when the 1 bit is a first value, it indicates switching to the target search space group, and when the 1 bit is a second value, it indicates skipping PDCCH monitoring.

In this embodiment of this application, the first indication includes a 2 bit, where when the 2 bit is a third value, it indicates switching to the target search space group; when the 2 bit is a fourth value, it indicates skipping PDCCH monitoring; and when the 2 bit is a fifth value, it indicates switching to the target search space group and skipping PDCCH monitoring.

In this embodiment of this application, the first DCI further includes a second indication, the second indication is used to indicate a first time interval, and the first determining module 702 is further configured to determine a PDCCH monitoring behavior within the first time interval and/or after the first time interval based on the first DCI.

In this embodiment of this application, the apparatus further includes an obtaining module, configured to obtain information about a first search space group and/or a second search space group, where the first search space group is not associated with any search space or the first search space group is not configured with configuration information related to PDCCH monitoring; and the second search space group is used for PDCCH monitoring after the first time interval.

In this embodiment of this application, the first search space group and/or the second search space group are/is configured by a network side and/or specified by a protocol.

In this embodiment of this application, the second search space group includes at least one of the following: an arbitrary search space group, a default search space group, the first search space group, or a current search space group in search space groups configured in a network.

In this embodiment of this application, the first determining module 702 is further configured to: in a case that the first indication is used to indicate switching to the target search space group, monitor the PDCCH by using the target search space group within the first time interval; or in a case that the first indication is used to indicate switching to the target search space group, monitor the PDCCH by using the target search space group within the first time interval, and monitor the PDCCH by using the second search space group after the first time interval.

In this embodiment of this application, the first determining module 702 is further configured to: in a case that the first indication is used to indicate skipping PDCCH monitoring, skip PDCCH monitoring within the first time interval; or in a case that the first indication is used to indicate skipping PDCCH monitoring, skip PDCCH monitoring within the first time interval, and monitor the PDCCH by using the second search space group after the first time interval.

In this embodiment of this application, the first determining module 702 is further configured to: in a case that the first indication is used to indicate switching to the target search space group and skipping PDCCH monitoring, skip PDCCH monitoring within the first time interval and monitor the PDCCH by using the target search space group after the first time interval; or in a case that the first indication is used to indicate switching to the target search space group and skipping PDCCH monitoring, skip PDCCH monitoring within the first time interval and monitor the PDCCH by using the second search space group after the first time interval.

In this embodiment of this application, the target search space group includes at least one of the following:

(1) an arbitrary search space group in search space groups configured in a network;

(2) a default search space group; or (3) a first search space group.

In this embodiment of this application, a unit of the first time interval is any one of the following:

(1) a slot;

(2) a symbol;

(3) a ms;

(4) a PDCCH monitoring period of the target search space group;

(5) a PDCCH monitoring period of a current search space group; and (6) a DRX cycle.

In this embodiment of this application, a start moment of the first time interval is at least one of the following:

(1) an effective moment of the first indication;

(2) an application moment of the first indication; or (3) a start moment of a specific time unit after receiving the first DCI.

In this embodiment of this application, an interval between the effective moment of the first indication and finishing receiving the first DCI is an effective delay of the first indication, or an interval between the application moment of the first indication and finishing receiving the first DCI is an application delay of the first indication.

The apparatus provided in this embodiment of this application can implement the processes implemented in the method embodiment shown in FIG. 3, and achieve a same technical effect. To avoid repetition, details are not provided herein again.

Figure 8:
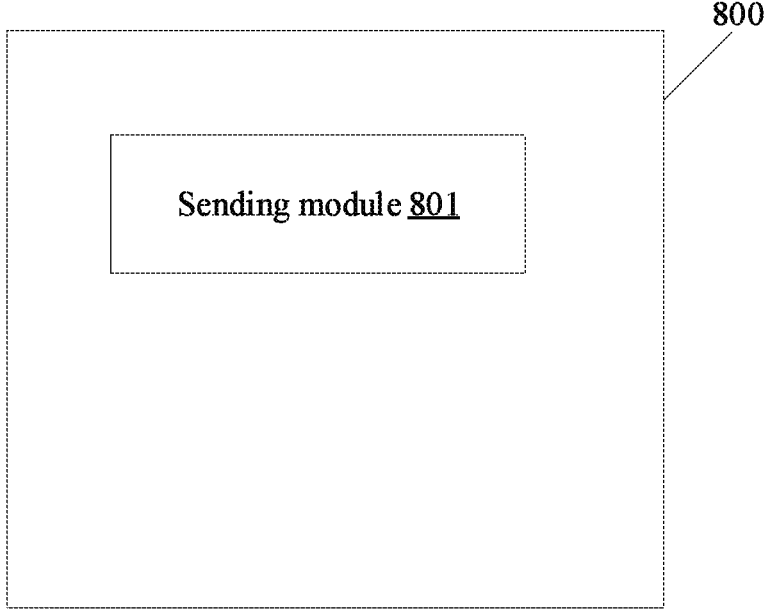
FIG. 8 is a second schematic diagram of an energy saving indication apparatus according to an embodiment of this application.

Referring to FIG. 8, an embodiment of this application provides an energy saving indication apparatus. The apparatus 800 includes:

a sending module 801, configured to send first DCI, where the first DCI includes a first indication, and the first DCI is used for a terminal to determine a PDCCH monitoring behavior, where the first indication is used to indicate at least one of the following: switching to a target search space group or skipping PDCCH monitoring.

In this embodiment of this application, the first indication includes a 1 bit, where when the 1 bit is a first value, it indicates switching to the target search space group, and when the 1 bit is a second value, it indicates skipping PDCCH monitoring.

In this embodiment of this application, the first indication includes a 2 bit, where when the 2 bit is a third value, it indicates switching to the target search space group; when the 2 bit is a fourth value, it indicates skipping PDCCH monitoring; and when the 2 bit is a fifth value, it indicates switching to the target search space group and skipping PDCCH monitoring.

In this embodiment of this application, the first DCI further includes a second indication, where the second indication is used to indicate a first time interval, and the first DCI is used to determine a PDCCH monitoring behavior within the first time interval and/or after the first time interval.

In this embodiment of this application, the apparatus 800 further includes:

a configuring module, configured to configure a first search space group and/or a second search space group, where the first search space group is not associated with any search space or the first search space group is not configured with configuration information related to a PDCCH; and the second search space group is used for PDCCH monitoring after the first time interval.

In this embodiment of this application, the second search space group includes at least one of the following: an arbitrary search space group, a default search space group, the first search space group, or a current search space group in search space groups configured in a network.

In this embodiment of this application, in a case that the first indication is used to indicate switching to the target search space group, the PDCCH monitoring behavior includes any one of the following:

(1) monitoring the PDCCH by using the target search space group within the first time interval; and (2) monitoring the PDCCH by using the target search space group within the first time interval, and monitoring the PDCCH by using the second search space group after the first time interval.

In this embodiment of this application, in a case that the first indication is used to indicate skipping PDCCH monitoring, the PDCCH monitoring behavior includes any one of the following:

(1) skipping PDCCH monitoring within the first time interval; and (2) skipping PDCCH monitoring within the first time interval, and monitoring the PDCCH by using the second search space group after the first time interval.

In this embodiment of this application, in a case that the first indication is used to indicate switching to the target search space group and skipping PDCCH monitoring, the PDCCH monitoring behavior includes any one of the following:

(1) skipping PDCCH monitoring within the first time interval, and monitoring the PDCCH by using the target search space group after the first time interval; and (2) skipping PDCCH monitoring within the first time interval, and monitoring the PDCCH by using the second search space group after the first time interval.

In this embodiment of this application, the target search space group includes at least one of the following:

(1) an arbitrary search space group in search space groups configured in a network;

(2) a default search space group; or (3) a first search space group.

In this embodiment of this application, a unit of the first time interval is any one of the following:

(1) a slot;

(2) a symbol;

(3) a ms;

(4) a PDCCH monitoring period of the target search space group;

(5) a PDCCH monitoring period of a current search space group; and (6) a DRX cycle.

In this embodiment of this application, a start moment of the first time interval is at least one of the following:

(1) an effective moment of the first indication;

(2) an application moment of the first indication; or (3) a start moment of a specific time unit after receiving the first DCI.

In this embodiment of this application, an interval between the effective moment of the first indication and finishing receiving; the first is an effective delay of the first indication, or an interval between the application moment of the first indication and finishing receiving the first DCI is an application delay of the first indication.

The apparatus provided in this embodiment of this application can implement the processes implemented in the method embodiment shown in FIG. 4, and achieve a same technical effect. To avoid repetition, details are not provided herein again.

Figure 9:
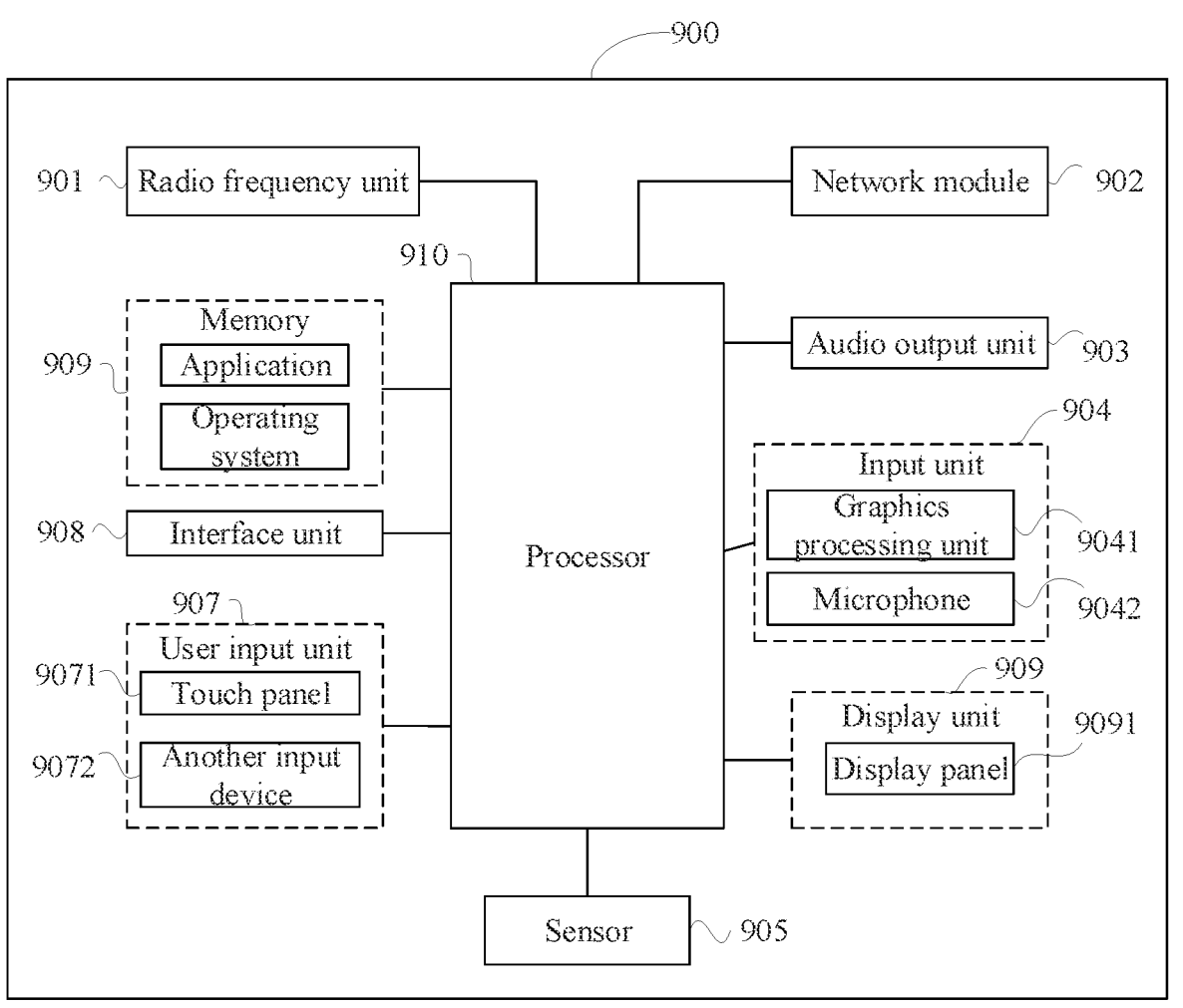
FIG. 9 is a schematic diagram of a terminal according to an embodiment of this application.

FIG. 9 is a schematic diagram of a hardware structure of a terminal for implementing embodiments of this application. The terminal 900 includes but is not limited to components such as a radio frequency unit 901, a network module 902, an audio output unit 903, an input unit 904, a sensor 905, a display unit 906, a user input unit 907, an interface unit 908, a memory 909, and a processor 910.

A person skilled in the art can understand that the terminal 900 may further include a power supply (such as a battery) that supplies power to each component. The power supply may be logically connected to the processor 910 by using a power supply management system, to implement functions such as charging and discharging management, and power consumption management by using the power supply management system. The terminal structure shown in FIG. 9 constitutes no limitation on the terminal, and the terminal may include more or fewer components than those shown in the figure, or combine some components, or have different component arrangements. Details are not described herein.

It should be understood that, in this embodiment of this application, the input unit 904 may include a Graphics Processing Unit (GPU) 9041 and a microphone 9042, and the graphics processing unit 9041 processes image data of a still picture or a video obtained by an image capture apparatus (such as a camera) in a video capture mode or an image capture mode. The display unit 906 may include a display panel 9061. The display panel 9061 may be configured in a form such as a liquid crystal display or an organic light-emitting diode. The user input unit 907 includes a touch panel 9071 and another input device 9072. The touch panel 9071 is also referred to as a touchscreen. The touch panel 9071 may include two parts: a touch detection apparatus and a touch controller. The another input device 9072 may include but is not limited to one or more of a physical keyboard, a function key (such as a volume control key or an on/off key), a trackball, a mouse, a joystick, and the like. Details are not described herein.

In this embodiment of this application, the radio frequency unit 901 receives downlink data from a network side device and then sends the downlink data to the processor 910 for processing; and sends uplink data to the network side device. Usually, the radio frequency unit 901 includes but is not limited to an antenna, at least one amplifier, a transceiver, a coupler, a low noise amplifier, a duplexer, and the like.

The memory 909 may be configured to store a software program or an instruction and various data. The memory 909 may mainly include a program or instruction storage area and a data storage area. The program or instruction storage area may store an operating system, and an application or an instruction required by at least one function (for example, a sound playing function or an image playing function). In addition, the memory 909 may include a high-speed random access memory, and may further include a non-volatile memory. The non-volatile memory may be a Read-only Memory (ROM), a Programmable ROM (PROM), an Erasable PROM (EPROM), an Electrically EPROM (EEPROM), or a flash memory, for example, at least one disk storage component, a flash memory component, or another non-volatile solid-state storage component.

The processor 910 may include one or more processing units. In some implementations, an application processor and a modem processor may be integrated into the processor 910. The application processor mainly processes an operating system, a user interface, an application, an instruction, or the like. The modem processor mainly processes wireless communications; for example, a baseband processor. It can be understood that, alternatively, the modem processor may not be integrated into the processor 910.

The terminal provided in this embodiment of this application can implement the processes implemented in the method embodiment shown in FIG. 3, and achieve a same technical effect. To avoid repetition, details are not provided herein again.

Figure 10:
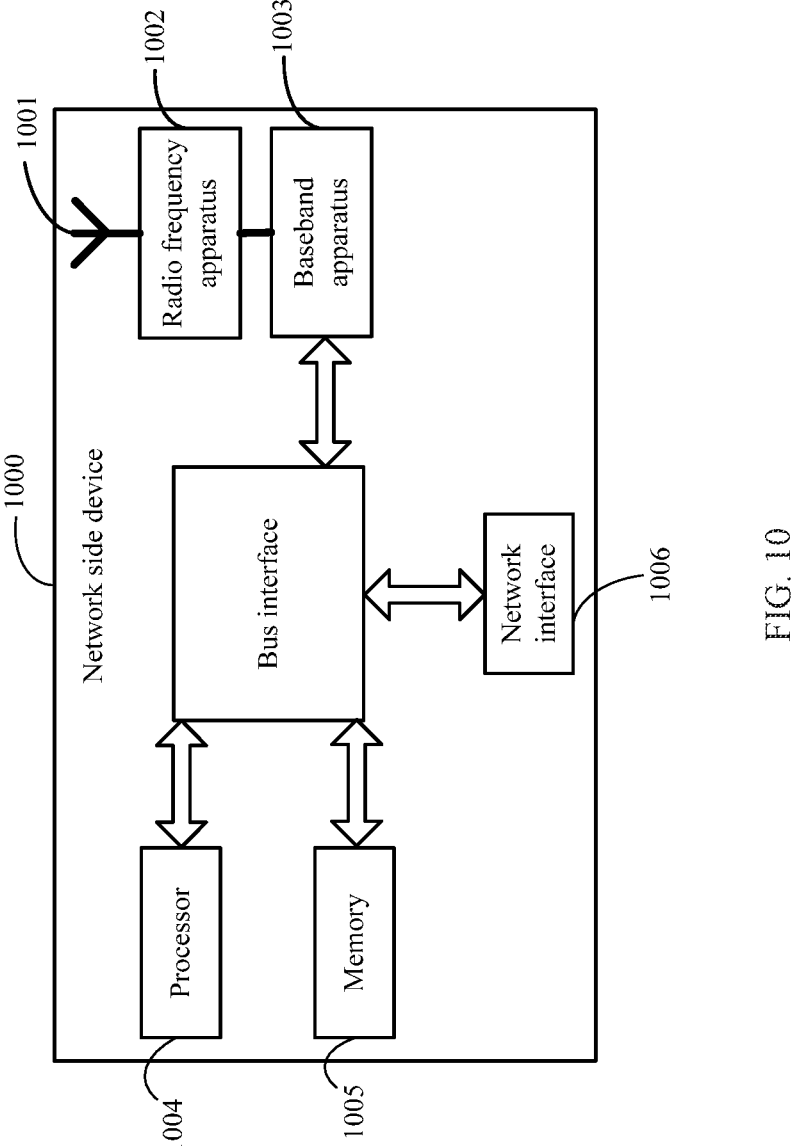
FIG. 10 is a schematic diagram of a network side device according to an embodiment of this application.

An embodiment of this application further provides a network side device. As shown in FIG. 10, the network side device 1000 includes an antenna 1001, a radio frequency apparatus 1002, and a baseband apparatus 1003. The antenna 1001 is connected to the radio frequency apparatus 1002. In an uplink direction, the radio frequency apparatus 1002 receives information by using the antenna 1001, and sends the received information to the baseband apparatus 1003 for processing. In a downlink direction, the baseband apparatus 1003 processes information to be sent and sends the information to the radio frequency apparatus 902, and the radio frequency apparatus 902 processes the received information and sends the information through the antenna 1001.

The frequency band processing apparatus may be located in the baseband apparatus 1003. The method performed by the network side device in the foregoing embodiment may be implemented in the baseband apparatus 1001. The baseband apparatus 1003 includes a processor 1004 and a memory 1005.

The baseband apparatus 1003 may include, for example, at least one baseband board, where a plurality of chips are disposed on the baseband board. As shown in FIG. 10, one chip is, for example, the processor 1004, which is connected to the memory 1005, so as to invoke a program in the memory 1005 to perform operations of the network device shown in the foregoing method embodiment.

The baseband apparatus 1003 may further include a network interface 1006, configured to exchange information with the radio frequency apparatus 1002. For example, the interface is a Common Public Radio Interface (CPRI for short).

In some implementations, the network side device in this embodiment of this application further includes an instruction or a program that is stored in the memory 1005 and that can be run on the processor 1004. The processor 1004 invokes the instruction or the program in the memory 1005 to perform the method performed by the modules shown in FIG. 8, and a same technical effect is achieved. To avoid repetition, details are not described herein again.

An embodiment of this application further provides a computer program product. The computer program product is stored in a non-volatile storage medium, and the computer program product is executed by at least one processor to implement steps of the method shown in FIG. 3 or FIG. 4.

An embodiment of this application further provides a readable storage medium, where the readable storage medium stores a program or an instruction, and when the program or the instruction is executed by a processor, the processes of the method embodiments in FIG. 3 or FIG. 4 are implemented, and a same technical effect can be achieved. To avoid repetition, details are not described herein again.

The processor is a processor in the terminal in the foregoing embodiment. The readable storage medium includes a computer-readable storage medium, such as a computer Read-only Memory (ROM), a Random Access Memory (RAM), a magnetic disk, or an optical disc.

An embodiment of this application further provides a chip. The chip includes a processor and a communications interface, the communications interface is coupled to the processor, and the processor is configured to run a program or an instruction of a network side device to implement the processes of the method embodiments in FIG. 3 or FIG. 4, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that in this specification, the term "include," "comprise," or any other variant is intended to cover non-exclusive inclusion, so that a process, method, article, or apparatus that includes a series of elements includes not only those elements but also other elements that are not explicitly listed, or includes elements inherent to such a process, method, article, or apparatus. An element limited by "includes a . . . " does not, without more constraints, preclude the presence of additional identical elements in the process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or certainly may be implemented by using hardware. Based on such an understanding, the technical solutions of this application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

The embodiments of this application are described with reference to the accompanying drawings. However, this application is not limited to the foregoing specific implementations. The foregoing specific implementations are merely examples, but are not limiting. A person of ordinary skill in the art may make many forms without departing from the objective and the scope of the claims of this application, and these forms all fall within the protection scope of this application.

The invention claimed is:

1. A method, performed by a terminal, for saving energy, wherein the method comprises:
receiving first Downlink Control Information (DCI), wherein the first DCI comprises a first indication; and
determining a Physical Downlink Control CHannel (PDCCH) monitoring behavior based on the first DCI, wherein the first indication comprises two bits, wherein:
when the two bits have a first value, the two bits indicate switching to a target search space group; and
when the two bits have a second value, the two bits indicate skipping PDCCH monitoring.

2. The method according to claim 1, wherein
when the two bits have a third value, the two bits indicate switching to the target search space group and skipping PDCCH monitoring.

3. The method according to claim 1, wherein the first DCI further comprises a second indication, and the second indication is used to indicate a first time interval, wherein the determining a PDCCH monitoring behavior based on the first DCI comprises:
determining a PDCCH monitoring behavior within the first time interval or after the first time interval based on the first DCI.

4. The method according to claim 3, wherein the determining a PDCCH monitoring behavior within the first time interval or after the first time interval based on the first DCI comprises any one of the following:
when the two bits indicate switching to the target search space group, monitoring the PDCCH by using the target search space group within the first time interval; or
when the two bits indicate switching to the target search space group, monitoring the PDCCH by using the target search space group within the first time interval, and monitoring the PDCCH by using the second search space group after the first time interval.

5. The method according to claim 3, wherein the determining a PDCCH monitoring behavior within the first time interval or after the first time interval based on the first DCI comprises any one of the following:
when the two bits indicate skipping PDCCH monitoring, skipping PDCCH monitoring within the first time interval; or
when the two bits indicate skipping PDCCH monitoring, skipping PDCCH monitoring within the first time interval, and monitoring the PDCCH by using the second search space group after the first time interval.

6. The method according to claim 3, wherein the determining a PDCCH monitoring behavior within the first time interval or after the first time interval based on the first DCI comprises any one of the following:
when the two bits indicate switching to the target search space group and skipping PDCCH monitoring, skipping PDCCH monitoring within the first time interval, and monitoring the PDCCH by using the target search space group after the first time interval; or
when the two bits indicate switching to the target search space group and skipping PDCCH monitoring, skipping PDCCH monitoring within the first time interval, and monitoring the PDCCH by using the second search space group after the first time interval.

7. The method according to claim 3, wherein a unit of the first time interval is any one of the following:
a slot;
a symbol;
a millisecond;
a PDCCH monitoring period of the target search space group;
a PDCCH monitoring period of a current search space group; or
a Discontinuous Reception (DRX) cycle.

8. The method according to claim 3, wherein a start moment of the first time interval is at least one of the following:
an effective moment of the first indication;
an application moment of the first indication; or
a start moment of a specific time unit after receiving the first DCI.

9. The method according to claim 8, wherein an interval between the effective moment of the first indication and finishing receiving the first DCI is an effective delay of the first indication, or an interval between the application moment of the first indication and finishing receiving the first DCI is an application delay of the first indication.

10. The method according to claim 1, wherein before receiving the first DCI, the method further comprises:
obtaining information about a first search space group or a second search space group,
wherein the first search space group is not associated with any search space or the first search space group is not configured with configuration information related to PDCCH monitoring, and the second search space group is used for PDCCH monitoring after a first time interval.

11. The method according to claim 10, wherein the first search space group or the second search space group is configured by a network side device or specified by a protocol.

12. The method according to claim 10, wherein the second search space group comprises at least one of the following:

an arbitrary search space group;

a default search space group;

the first search space group; or a current search space group in search space groups configured in a network.

13. The method according to claim 1, wherein the target search space group comprises at least one of the following:

an arbitrary search space group in search space groups configured in a network;

a default search space group; or the first search space group.

14. A terminal, comprising a processor, a memory, and a program stored in the memory and executable on the processor, wherein when the program is executed by the processor, the method according to claim 1 is implemented.

15. The method according to claim 1, wherein when the two bits have the first value, the two bits indicate switching from a first search space group to the target search space group.

16. A method, performed by a network side device, for saving energy wherein the method comprises:

sending first Downlink Control Information (DCD), wherein the first DCI comprises a first indication, and the first DCI is used for a terminal to determine a PDCCH monitoring behavior, wherein the first indication comprises two bits, wherein:

when the two bits have a first value the two bits indicate switching to a target search space group; and when the two bits have a second value, the two bits indicate skipping PDCCH monitoring.

17. A network side device, comprising a processor, a memory, and a program stored in the memory and executable on the processor, wherein when the program is executed by the processor, steps of the method according to claim 15 is implemented.

18. The method according to claim 16, wherein when the two bits have a third value, the two bits indicate switching to the target search space group and skipping PDCCH monitoring.

19. An apparatus for saving energy, comprising:

a memory configured to store computer-readable instructions; and a processor coupled to the memory and configured to execute the computer-readable instructions, wherein the computer-readable instructions, when executed by the processor, cause the processor to perform operations comprising:

receiving first Downlink Control Information (DCI), wherein the first DCI comprises a first indication; and determining a Physical Downlink Control CHannel (PDCCH) monitoring behavior based on the first DCI, wherein the first indication comprises two bits, wherein;

when the two bits have a first value, the two bits indicate switching to a target search space group; and when the two bits have a second value, the two bits indicate skipping PDCCH monitoring.

20. The apparatus according to claim 19, wherein when the two bits have a third value, the two bits indicate switching to the target search space group and skipping PDCCH monitoring.

\* \* \* \* \*